Feb. 9, 1932. G. H. MAINS 1,844,512
LAMINATED MATERIAL
Filed Oct. 11, 1929

INVENTOR
Gerald H. Mains
ATTORNEY

UNITED STATES PATENT OFFICE

GERALD H. MAINS, OF MURRYSVILLE, PENNSYLVANIA, ASSIGNOR TO WESTINGHOUSE ELECTRIC & MANUFACTURING COMPANY, A CORPORATION OF PENNSYLVANIA

LAMINATED MATERIAL

Application filed October 11, 1929. Serial No. 398,928.

My invention relates to laminated material, and more particularly to composite laminated structures comprising reenforced sheets of fibrous material and to the process of producing same.

An object of my invention is to produce a laminated structure comprising one or more metallic strips having a roughened or etched surface, to which sheets or strips of fibrous material, impregnated with a suitable binder, such as a phenolic condensation product, are molded under heat and pressure to form a composite article.

Another object of my invention is to provide an improved method of securely uniting fibrous sheet material to a metallic member which comprises treating the metallic member to produce a roughened or etched surface and then molding sheets of fibrous material on the roughened surface under sufficient heat and pressure to produce a unitary, laminated structure having a high tensile strength.

Another and more specific object of my invention is to provide an improved method of uniting laminated sheet material to strips or sheets of metal which comprises treating the metal with a suitable roughening agent, such as a sand blast, to produce an indented or uneven surface, immersing the sheet or strip in a pickling bath to clean and further etch the material, rinsing and drying the metal to produce a clean surface and finally molding fibrous sheet material, impregnated with a suitable binder, such as a phenolic condensation product, upon the roughened surface, under heat and pressure, to form a composite article.

It has heretofore been proposed to mold metallic sheets or strips into laminated products for the purpose of reenforcing the material and increasing its strength. Difficulty, however, has been experienced in securing a strong joint between the fibrous sheet material and the metallic member and this is especially true when the structure is made from comparatively thin sheets of material.

I have made the discovery that, if the metal is roughened or etched in a suitable manner, strips or sheets of fibrous material, impregnated with a binder that is capable of being hardened under heat and pressure, may be securely united to the faces of the metal sheets to form a strong unitary structure.

My invention may be utilized in various applications. For instance, it is particularly valuable in aeroplane construction, where maximum strength and stiffness for a minimum weight is required. It may also be utilized in structural elements, such as panels, angles, channels, tubes, or the like, or it may be employed in providing protective or decorative covers for the surfaces of containers.

My invention will be better understood by reference to the accompanying drawings, in which Fig. 1 is a perspective view of a metallic sheet that has been roughened on one face and a plurality of sheets of fabric material that have been impregnated with a phenolic condensation product.

In practicing my invention, the metal sheet or strip 1 is first roughened by any suitable means, such as a sand blast. The sand or grit employed for this treatment may vary considerably in size but I prefer to utilize material that will pass through a screen having 20 to 40 meshes per square inch. The material is next immersed in a dilute acid bath. An ordinary pickling bath, such as a dilute solution of sulphuric or nitric acid, is suitable for this purpose. The plate is then rinsed in water and permitted to dry. This treatment forms an irregular etched surface that is partially sulphated or oxidized.

The fibrous sheet material is prepared by the usual process which consists in first impregnating the sheets with a suitable binder, such as phenolic condensation product, and then drying the sheets at a sufficient temperature to eliminate the solvent without hardening the binder. A plurality of sheets of the impregnated fibrous material is then placed on one or both sides of the metallic sheet and the layers consolidated, under heat and pressure, into a unitary, composite structure.

A pressure of 500 pounds to 2,000 pounds per square inch and a temperature of 100° C. to 180° C. are suitable. The heat causes the binder to flow, and the pressure forces the fibrous material into the indented and etched portions of the plates. The partially sulphated or oxidized surface also increases the adhesion between the fibrous sheet material and the metal.

Upon the application of continued heat and pressure, the binder is solidified to form a composite structure that is strong and rigid. My improved process is particularly valuable for aeroplane structure because composite elements or plates that are comparatively thin in cross section and have greater strength than the molded material and greater rigidity than metal of the same weight may be produced. The fibrous material also protects the metal from corrosion and permits the formation of decorative effects.

Figure 1:
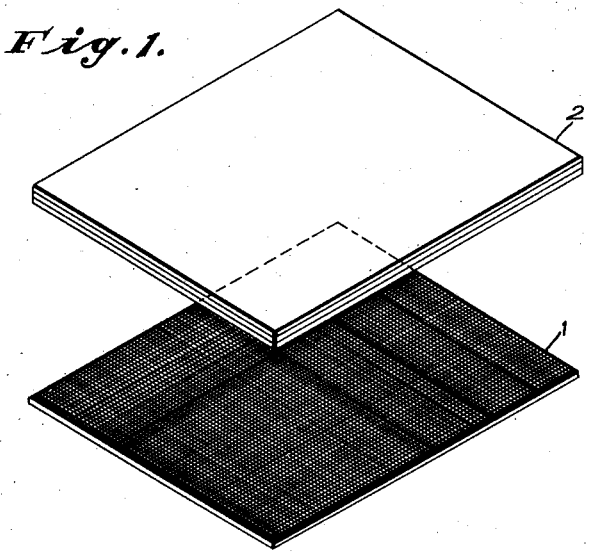
Figure 2:
Fig. 2 is a cross sectional view of a molded laminated structure showing the fibrous material molded to the roughened face of the metallic sheet.
Figure 3:
Fig. 3 is a similar view of a laminated structure showing a sheet of metal roughened on both faces and fibrous material molded thereto.
Figure 4:
Fig. 4 is a cross sectional view of a molded laminated structure showing alternate layers of metal having roughened surfaces on both sides and alternate layers of fibrous sheet material molded to the metal.
Figure 5:
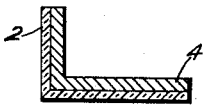
Figs. 5 and 6 are cross sectional views of structural elements each showing a metallic element having a roughened surface to which fibrous sheet material has been molded.
Figure 6:
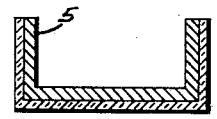
Figure 7:
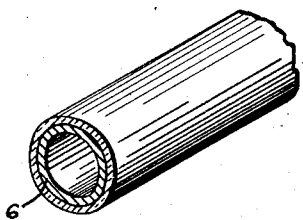
Figs. 7 and 8 are perspective views, respectively, partially in cross section, of a pipe and a container made in a similar manner.
Figure 8:
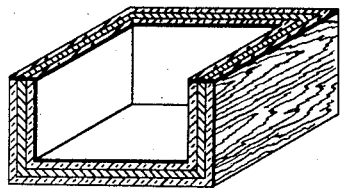

Referring to Figs. 1, 2 and 3 of the drawings, the numeral 1 designates a metal sheet that has been roughened and etched in preparation for the molding process and the numeral 2 the consolidated layers of fibrous material. As shown in Fig. 2, the fibrous material is molded to only one side of the metal sheet 1. In such structures, it is of course only necessary to roughen or etch one side of the metallic sheet but, when laminated structures are desired having fibrous material on both sides of the metal, as shown in Figs. 3 and 4, the metal will be roughened or etched on both sides. In Figs. 5, 6, 7 and 8 of the drawings, examples are given which illustrate various articles that may be constructed in accordance with my improved process. Figs. 5, 6 and 7 respectively show an angle iron 4, a channel 5 and a pipe or tube 6, having fibrous material molded on the outside, and Fig. 8 illustrates a container having molded material on both inner and outer surfaces.

Figure 9:
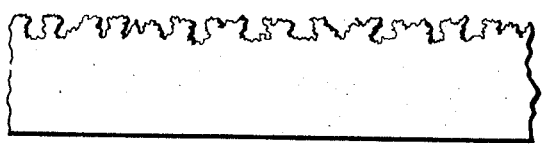
Fig. 9 is an exaggerated side view of a metallic sheet that has been roughened by a sand blast and etched with an acid.

Since the method of producing a roughened surface may be accomplished by various means, I do not desire to be limited in this respect. For instance, heavy metal rollers having suitable projections may be utilized for scoring, roughening or undercutting the surface of the metal, or other suitable mechanical means may be employed, such as a heavy wire brush. I prefer, however, to utilize the sand-blast treatment for roughening the surface of the metal and to further etch it by means of a suitable acid bath. The sand-blast treatment is economical and has the tendency to undercut the surface of the metal as shown in Fig. 9 of the drawings. The roughened portions are then further etched by means of acid. An undercut roughened surface has a particular advantage because the fibrous material has a greater coefficient of contraction than the metal and, during the cooling of the composite plate in the molding process, it will, accordingly, be securely anchored in the indentations formed on the surface of the metal.

The pickling bath to be utilized will depend upon the metal employed as the reenforcing element. For example, when a ferrous metal, such as iron or steel, is employed, the standard sulphuric-acid pickling bath is very satisfactory. When copper is utilized, a pickling bath comprising a mixture of sulphuric and nitric acids gives good results. For etching aluminum or aluminum alloys, I prefer to utilize an aqueous solution of hydrochloric acid as the etching agent. A pickling bath, such as sulphuric or nitric acid, is preferred when it is capable of etching the particular metal desired because these baths have the tendency to produce a partially oxidized or sulphated surface which increases the adhesion between the metallic sheet and the fibrous material during the molding operations.

While I have described my invention in considerable detail, it will be understood that I do not desire to be limited to the exact process and structure disclosed. For example, the moldable material may consist of fibrous sheet material or it may consist of agglomerated material, such as chopped, punched or shredded cloth, duck, paper or other fibrous material, that has been impregnated with a suitable binder, such as a phenolic condensation product.

Other modifications of my invention will become apparent to those skilled in the art. I desire, therefore, that only such limitations shall be imposed on my invention as are required by the prior art and the appended claims.

I claim as my invention:

1. The method of forming a laminated structure comprising a layer of metal and a layer of fibrous material which comprises treating the layer of metal to form an indented surface, impregnating the fibrous material with a binder capable of being hardened under heat and pressure, assembling the layers and subjecting the assembled structure to sufficient heat and pressure to force a portion of the fibrous material into said indentations and to harden the binder, thereby securely anchoring the layer of fibrous material to the layer of metal.

2. The method of forming a laminated structure comprising a layer of metal and a plurality of layers of fibrous material impregnated with a fusible binder capable of being hardened when heated, which comprises treating the layer of metal to form indented surfaces on both sides, assembling the fibrous material on each side of the layer of metal and molding the assembled layers, under heat and pressure, to form a composite structure, sufficient heat and pressure being applied to force the fibrous material into the indentations and to harden the binder, thereby securely anchoring the fibres to the indentations.

3. A laminated material comprising a layer of fibrous material and a sheet or strip of metal having a surface provided with indentations, a portion of said fibrous material extending into said indentations and being securely anchored thereto.

4. A laminated material comprising a layer of fibrous material and a sheet or strip of metal provided with indentations, a portion of said fibrous material extending into said indentations and being securely anchored thereto by means of a heat-hardened binder.

5. A laminated material comprising a layer of fibrous material and a sheet or strip of metal provided with a surface having etched indentations, a portion of said fibrous material extending into said indentations and being securely anchored thereto by means of a heat-hardened binder.

6. A laminated material comprising a plurality of layers of fibrous material and a sheet of metal having both of its surfaces provided with indentations, a portion of each of the layers of said fibrous material extending into said indentations and being securely anchored thereto by means of a heat-hardened binder.

7. The method of forming a laminated structure comprising a layer of metal and a layer of fibrous material which comprises treating the layer of metal to form an indented surface, impregnating the fibrous material with a solution of a binder capable of being hardened under heat and pressure, partially drying the impregnated fibrous material at a sufficient temperature to eliminate the solvent without hardening the binder, assembling the layers and finally applying sufficient heat and pressure to force a portion of the fibrous material into said indentations and harden the binder thereby securely anchoring the layer of fibrous material to the layer of metal.

8. The method of forming a laminated structure comprising a layer of metal and a layer of fibrous material which comprises treating the layer of metal with a roughening agent capable of forming undercut indentations, etching the surface of the indentations, impregnating the fibrous material with a solution of a binder capable of being hardened under heat and pressure, partially drying the impregnated fibrous material at a sufficient temperature to eliminate the solvent without hardening the binder, assembling the layers and finally applying sufficient heat and pressure to force a portion of the fibrous material into said indentations and harden the binder, thereby securely anchoring the layer of fibrous material to the layer of metal.

9. The method of forming a laminated structure comprising a layer of metal and a layer of fibrous material which comprises treating the layer of metal with a sand blast with sand of such a size and in such a manner that undercut indentations will be formed, etching the surface of said indentations with an acid, impregnating the fibrous material with a solution of a binder capable of being hardened under heat and pressure, partially drying the impregnating fibrous material at a sufficient temperature to eliminate the solvent without hardening the binder, assembling the layers and finally applying sufficient heat and pressure to force a portion of the fibrous material into said indentations and harden the binder, thereby securely anchoring the layer of fibrous material to the layer of metal.

In testimony whereof, I have hereunto subscribed my name this first day of October, 1929.

GERALD H. MAINS.